Figure 3:
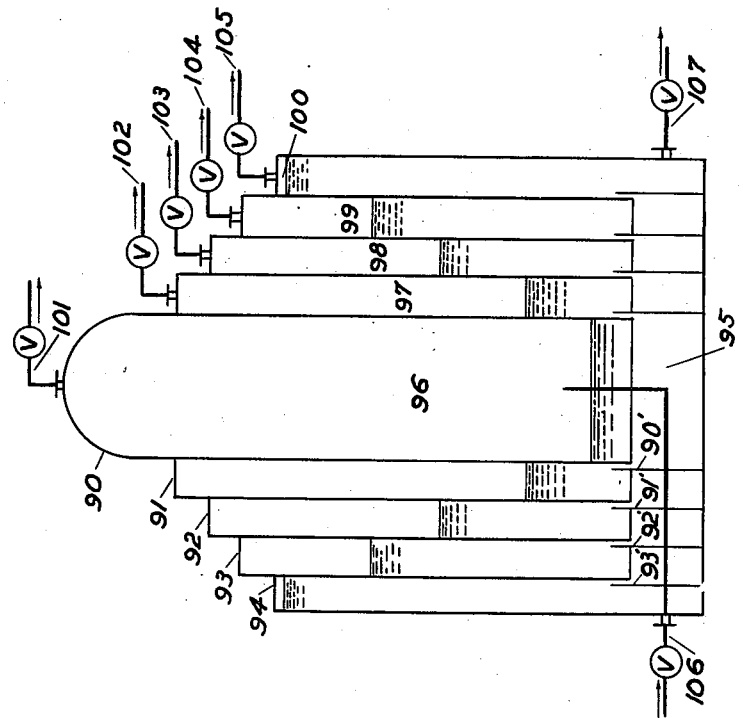

Dec. 11, 1951  A. W. GOLDSBARRY ET AL  2,578,469
DIFFERENTIAL PRESSURE DISTILLING
APPARATUS AND METHOD
Filed April 7, 1948                                 2 SHEETS—SHEET 1

INVENTORS
ALBERT W. GOLDSBARRY
MAX M. TOMASZEWSKI
BY Edward H. Lang
ATTORNEY

INVENTORS
ALBERT W. GOLDSBARRY
MAX M. TOMASZEWSKI
BY
Edward H. Lang
ATTORNEY

Patented Dec. 11, 1951

2,578,469

UNITED STATES PATENT OFFICE 2,578,469

DIFFERENTIAL PRESSURE DISTILLING APPARATUS AND METHOD

Albert W. Goldsbarry, Northbrook, and Max M. Tomaszewski, Chicago, Ill., assignors to The Pure Oil Company, Chicago, Ill., a corporation of Ohio Application April 7, 1948, Serial No. 19,558

4 Claims. (Cl. 196—84)

This invention relates to a method and an apparatus for the batch or continuous distillation of hydrocarbons and the fractionation thereof to deliver in separate fractions specific hydrocarbons occurring in a mixture. The apparatus comprises a structure which provides for distillation of a hydrocarbon mixture under a series of different but related pressures from which vapor streams at the selected differential pressures are removed, thereby to accomplish the fractionation.

Conventional apparatus used for the distillation of petroleum hydrocarbons and other liquids separable by fractionation procedures incorporate bubble tray columns which in operation maintain a reflux countercurrently contacting the vapor stream rising in the tower. Side streams of liquid, essentially vapor condensate, are removed from the tower and stripped in reboiling apparatus in essentially conventional manner. Another common type of fractionating apparatus is the heated packed tower which, upon analysis, can be shown to function fundamentally in the same manner in which a bubble tray column operates. There are various disadvantages involved in the design and operation of either bubble tray or packed towers for the performance of fine fractionations, the principal disadvantage being the very large pressure drop which occurs in the length of the column. Substantial heating and pressure are necessary to force vapor up through the heated type of column.

Accordingly, it is a fundamental object of the instant invention to provide an apparatus which takes advantage of the natural change in vapor pressure of a liquid mixture undergoing distillation to bring about flow of the liquid through an apparatus and to accomplish distillation thereof in zones maintained under different but related pressures.

A second object of the invention is to provide a still having internal partitions which will serve to cooperate with the liquid therein to define distilling sections.

It is a further object of the invention to provide an apparatus in which the pressure applied to the feed of liquid to the apparatus coupled with the degree of vacuum in the several sections of the apparatus is the principal cause of movement of liquid therethrough.

It is a further object of the invention to provide a method of distillation utilizing discrete positive pressure differentials through a distilling apparatus and for their control to establish distillation zones favorable to the adiabatic fractionation of cuts having narrow boiling ranges.

It is a further object of the invention to provide a method and an apparatus in which a liquid immiscible with that being distilled will accomplish the division of the apparatus into separate distilling zones.

It is another object of the invention to provide an apparatus in which a liquid immiscible with that being distilled will be the means by which heat is brought into the separate distilling zones.

Other objects and advantages of the invention will in part be obvious and in part appear hereinafter.

The invention, accordingly, comprises a method and an apparatus for conducting a distillation, which apparatus has the features of construction, combination of elements and arrangement of parts hereinafter described, the method involving the several steps and relation of one or more of such steps with respect to each of the others, said apparatus including a plurality of separate vapor distillation zones providing for liquid communication with each other under distilling conditions, said distilling zones having provision for being maintained under different pressures in the vapor zone. The apparatus also is equipped with means for admitting liquid thereto so that liquid being distilled will find its own level in each of the several zones in accordance with the pressure maintained therein, whereby only certain vapors are separated in each zone to be removed from the still and further fractionated. In arranging for liquid communication between zones, provision for the flow of liquid from the point of inlet to that of outlet is automatically made.

Figure 1:
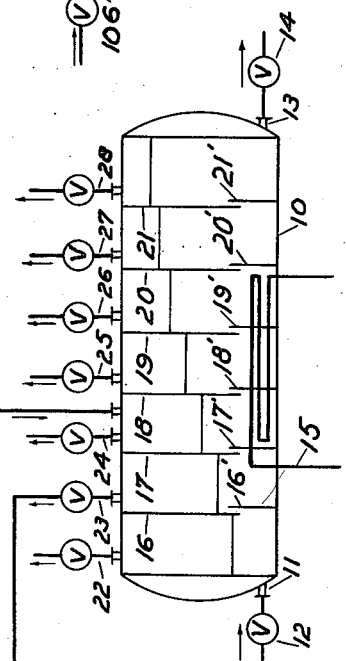
Figure 2:
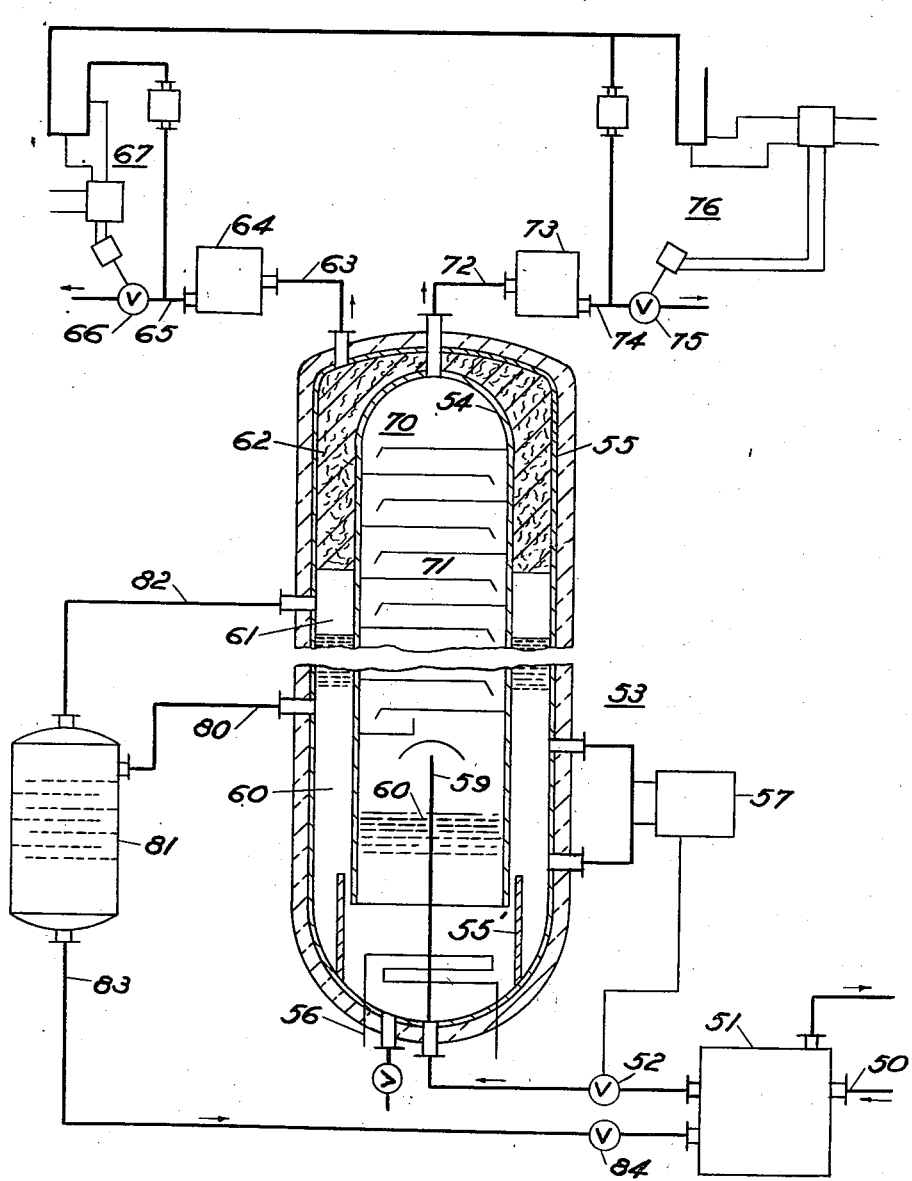

The details of the construction of the apparatus and the method of carrying out distillations in apparatus constituting the invention, will be more clearly understood by reference to the accompanying drawings and the specification explanatory thereof, in which drawings, Figure 1 is a longitudinal cross section through a differential pressure still showing in diagrammatic form the relationship of the parts thereof;

Figure 2 is a diagrammatic showing of a distilling plant including the apparatus shown in Figure 1 to illustrate the layout of the apparatus, an alternative form of still, and the relationship of several parts of a typical distilling plant to each other;

Figure 3 indicates in brief form how several cylinders could be arranged concentrically to accomplish division of a still pot into a plurality of zones.

In the drawing comprising Figure 1, 10 represents a still pot having inlet 11 controlled by a valve 12 and an outlet 13 controlled by a valve 14. Heating means is indicated diagrammatically as coil 15, which may be a conventional steam or electrical one. Dividing the still pot into a series of zones are partitions and baffles 16, 17, 18, 19, 20 and 21, 16', 17', 18', 19', 20' and 21', respectively. Each of the sections of the pot thus defined is equipped with a valved outlet 22, 23, 24, 25, 26, 27 and 28, respectively, which serves to conduct vapors to such further fractionating or condensing zones as may be called for by the distillation problem at hand. Illustrative of the type of connection which can be made to the still pot is tower 30 connected to valved outlet 23. Tower 30 is essentially a conventional type plate column which provides for fractionation of feed entering at point 32 and leaving at point 33. Reflux is returned from the bottom of the tower 34 to a separate zone of the still pot, for example, that defined by partitions 17 and 18. Similar arrangements can be made conducting vapors from any one of the sections and returning reflux to another section containing vapors of higher boiling point.

In Figure 2, there is shown diagrammatically a modified form of the apparatus to illustrate the incorporation thereof into an operative distilling system for the fractionation of hydrocarbon vapors. Feed coming through line 50 and heat exchanger 51 past control valve 52 passes into still 53, which comprises essentially concentrically arranged cylindrical elements 54 and 55 which form the body of a still pot. Any connection between cylinders 54 and 55 near their lower ends is only made for support and the bottom of 54 nests with cylindrical baffle 55' to provide limited liquid communication between the inner cylinder and the annulus formed by the arrangement. A heating device 56 is provided in the bottom of the still to supply such heat as may be needed to maintain continuous operation. Any convenient heating means may be employed, such as steam or electrical coils.

A liquid level control 57 is provided to regulate the feed to the still. The feed comes to the apparatus through line 50, heat exchanger 51, control valve 52 and is introduced to the inner still through line 59 where it joins the body of liquid 60 in the still.

One portion of the vapor distillate is taken from the annular still section 61 containing packing 62, through line 63, to condensing and receiving system 64. Line 65 continues on through valve 66 to a vacuum pump. The pressure regulating system is indicated generally as 67.

Vapors formed in the central vaporizing zone 70 defined by cylinder 54 and the body of liquid 60 to pass over baffle plates 71 through line 72 to condensing and receiving system 73, which communicates through line 74 and valve 75 with a vacuum pump. A differential pressure regulator adjusted to maintain a desired pressure differential between the two distilling zones is indicated generally as 76.

Liquid is taken from the body 60 in the still through line 80, introduced into stripper 81 where it is fractionated and vapors returned via line 82 to annular vaporizing zone 61. The residue from stripper 81 is returned through line 83, valve 84, heat exchanger 51 to storage.

It will be seen that the arrangement of concentric cylinders shown in Figure 2 to accomplish the definition of two distilling zones having liquid communication with each other is essentially the same as the apparatus in Figure 1.

A variation of the apparatus shown in either Figure 1 or Figure 2 and the operation thereof can be accomplished by maintaining in the still sufficient molten material to contact the lower extremities of the baffles defining the separate distilling zones. Where a hydrocarbon mixture is to be fractionated and its boiling range is known, an alloy, a salt mixture, or a metal having a melting point within the appropriate range for accomplishing the distillation, can be used to seal off these vapor zones from each other. The advantage of employing such a device is that a definite controlled temperature is easily established and maintained in the apparatus. Likewise, when the apparatus is shut down, the alloy or molten salt mixture will solidify and keep the relative amounts of liquid in the several sections the same during the period when the still is not in operating condition.

The distilling operation can also be combined with a refining operation by using a fusible salt which will react with components of the crude to be removed.

Referring to Figure 1 and tracing the course of a feed through the apparatus will be helpful in determining the method of operation. A feed constituting a given hydrocarbon mixture enters the still 10 at inlet 11 and quickly will rise to a level where it seals off the several partitions, thereby to define several vaporizing zones. The pressure differentials to be maintained in the several vaporizing sections can be established and controlled in accordance with the available concentration of certain desired hydrocarbons in the liquid feed mixture, which hydrocarbons are to be removed from any given section. Naturally, allowance is made for the amount of heat energy removed by the removal of a given hydrocarbon by supplying additional heat to the body of liquid accomplishing the seal. This is readily determined by observation of the rate of vaporization of the hydrocarbon and the rate of removal of its vapor from a given section. As feed enters, it rises to the evaporation surface and, after equilibration, passes from the zone under the partition and is directed up to the next evaporation surface in the next zone. Liquid will seek a level in each of the zones determined by the pressure condition maintained in the zone, which in turn will determine the nature of the hydrocarbon to be removed therefrom. Thus, in the first section, a relatively high pressure will be maintained and the low boiling hydrocarbons will be brought off to the outlet valve. In the intermediate sections progressively lower pressures will be maintained, thereby permitting the removal of the higher boiling hydrocarbons with substantially little addition of heat. When a molten salt or metal is used to maintain the seal between zones, liquid being distilled with pass under the partitions and up past the baffles in its passage from zone to zone and in the process, contact the salt or metal. When the sealant used is reactive with the crude being distilled, substantial refinement is accomplished.

The several pressure differentials existing among the zones of the apparatus can be created by the use of back pressure valves in the vapor conduits conducting vapors from those zones. Also the same effect can be obtained by causing the vapor to take a devious path from the vapor zone in which it is generated by the imposition of bubble trays thereon through which the vapor must pass. Reduced pressure can be maintained in each of the zones by appropriate regulation of a vacuum pump serving the section. Such auxiliary heat as may be necessary to maintain equilibrium within the apparatus can be added as needed.

A further embodiment of the apparatus indicated very briefly in Figure 3 involves a structure like that shown in Figure 2 but obtains the effect of a plurality of vaporizing zones as shown in Figure 1 by employing a series of concentric shells, 90, 91, 92 and 93, telescoping with baffles 90′, 91′, 92′, 93′. Each zone is separated from the other by contact of its shell with the liquid body 95 maintained in the still pot to define vaporization zones 96, 97, 98, 99, 100, served by vapor outlets 101, 102, 103, 104, 105, respectively. Feed is brought in by line 106 in residue taken off by line 107. The apparatus, shown in Figure 3, is merely diagrammatic to show the concentric arrangement of a plurality of vaporizing zones. The necessary fractionating and condensing equipment, which would attach to the vapor outlets 101, 102, 103, 104, and 105, are not shown. Portions of the distilling liquid, rising into each of the concentric annuli, may be removed individually and sent as separate side streams to strippers similar to stripper 81, of Figure 2. The residue from these strippers may be returned in heat exchange relationship with the feed hydrocarbon entering line 106. This heat exchange arrangement may also include the residue leaving through line 107. The uncondensed vaporous portion from these strippers may be returned to the corresponding vapor zone from which the distilling liquid was removed. Similarly, as is shown by line 82, returning from stripper 81 to vapor zone 61, in Figure 2, the heating element, for the apparatus shown in Figure 3, may be incorporated in the same manner as the heating element 15, shown in Figure 1.

When it is desired to use a molten metal, alloy or salt mixture as a heating-sealing medium for the several zones of the apparatus, the metal or salt is added in amount sufficient to submerge the lower ends of the several partitions and seal them off to define the several vaporization compartments called for by the apparatus. Liquid to be distilled is added and will find its levels in the several compartments according to the pressures maintained. Liquid passes from one compartment to the next by bubbling under the partitions through the fused sealing metal or salt mixtures and is directed upward to the next evaporation surface by the adjacent baffle. Suitable metals or salts are selected by their melting points and reactivity with surfur compounds in the crude where simultaneous distillation and refinement are sought and for the distillation of ordinary crudes include: sodium hydroxide, M. P. 318° C.; sodium carbonate, M. P. 851° C.; sodium chloride, M. P. 800° C.; and others. Where the melting point of a salt is too high, it can be mixed with another to develop a mixture having a melting point in the correct range.

Where it is desired to prepare a mixture of hydrocarbon vapors and a reagent for further processing, the reagent may be used as the sealant in the distillation operation. Thus, mixtures of hydrocarbon vapor and sulfur vapor for reaction to form mercaptans or carbon disulfide, can be prepared by using sulfur, M. P. 120° C., B. P. 445° C., as the sealant. Similarly, mixtures of hydrocarbon vapor and vapor of aluminum chloride, M. P. 194.5° C. (under pressure), B. P. 183.7° C., can be prepared by using aluminum chloride as the sealant. In general, the selection of the sealant to be used, if it is to be something other than the crude itself, will depend upon matching the object to be accomplished and temperature to be used in distillation against the melting point, reactivity and cost of the sealant.

Should it be desired to break down a crude oil into a pair of standard range distillate products and a residue having a certain flash point, for example, distill a crude into three fractions comprising, a 400° F. end point gasoline, a 400° F. initial boiling point to 700° F. end point gas oil and a residual fuel oil after the 700° F. end point gas oil, a still could be constructed substantially as shown in Figure 2. For the preparation of these three fractions, the still would comprise two vertical concentric shells about 60 feet high having the shells in liquid communication at the bottom only to form the two liquid columns for distillation. The crude in a preheated condition would be introduced into the inner column at a temperature of about 490° F. and a pressure of about 860 millimeters of mercury, whereupon vaporization of about 40 per cent of the crude would take place. This portion of the crude would be fractionated through a bubble tray column having 30 to 35 trays to eliminate as a reflux about 10 per cent of the crude, so that about 30 per cent of the starting crude would emerge from the bubble tray column as 400° F. end point gasoline at atmospheric pressure and at about 415° F. for condensation.

The 10 per cent of reflux and the 60 per cent of unvaporized crude would be combined to furnish to the outer column 70 per cent of the crude at a temperature of about 460° F. which, when the pressure is reduced to 20 millimeters of mercury, would flash off about 35 to 40 percent of the crude. About 5 per cent of this vapor would be condensed and returned as reflux so that about 35 per cent of the crude fed to the apparatus would emerge as a distillate fuel oil for condensation as the fuel oil product. The third product, 700° F. initial residual fuel oil having about a 460° F. flash point, would be removed from the still in about a 35 per cent yield. Since it too has a temperature of about 400° F., it could be used for heating fresh feed coming from the heater into the apparatus.

With such a structure, the inner column would have a liquid evaporating surface about 48 feet lower than the outer column evaporating surface. This difference in level would represent the hot oil column acting as a barometric leg to balance the difference in pressures. This high outer column of oil envelopes the inner fractionating column as insulating and heating sleeve.

In other applications, the differential pressure still could be used for stripping lubricating oil after solvent refining; separating a mixture of ortho-, meta- and para-xylenes in azeotropic distillation; breaking constant boiling mixtures by changing the volumne ratio or by going to low pressure; extractive distillation of aromatics from crude petroleum; combination of absorption at one temperature and stripping at another temperature and pressure; the use of the still as a method for stabilizing a liquid product with the separation of a gaseous product and keeping the reaction going in situ in a continuous heat conserving or heat removing manner; any use involving the combination of distillation in pressure steps where the pressure differential can be maintained or controlled through a barometric leg with the application of the heat relationship thus afforded without necessarily breaking the continuity of the processed liquid body; transfer of liquids being processed in contact with catalytic agents from zone to zone, whereby variance of the pressure volume temperature relationships, concentrations or condition of catalyst may be changed in accordance with the average molecular weight of liquid being processed without bringing materials outside the system with attending avoidance of loss of heat and difficulty in handling.

Thus, it can be seen that by employing the principles of the construction of the apparatus shown and described, it can be applied to ordinary distillation problems and to various modifications thereof. Although only a limited description of the apparatus has been offered, the general applicability thereof should be apparent and the illustration should be taken as such and not as being restrictive of the invention.

What is claimed is:

1. The method of producing mixtures of sulfur and hydrocarbon vapors for conversion into sulfur compounds comprising maintaining a bed of molten sulfur in the bottom of a still, said still being divided into a plurality of vaporizing zones communicating with each other at their bottoms, maintaining said molten sulfur at a level sufficient to seal said vaporizing zones from each other, maintaining a pressure gradient from one vaporizing zone to the successive vaporizing zone, introducing hydrocarbons into the zone of highest pressure, causing the unvaporized hydrocarbons to flow from the zone of highest pressure successively through each zone to the zone of the lowest pressure, applying sufficient heat to vaporize desired hydrocarbons and sulfur in each zone and withdrawing mixtures of hydrocarbon vapors and sulfur from each vaporizing zone in accordance with the distilling characteristics of said hydrocarbons.

2. The method of producing reactable mixtures of a vaporizable reagent and hydrocarbon vapors comprising maintaining a bed if liquefied reagent in the bottom of a still, said still being divided into a plurality of vaporizing zones communicating with each other at their bottoms, maintaining said liquefied reagent at a level sufficient to seal said vaporizing zones from each other, maintaining a pressure gradient from each vaporizing zone to the successive vaporizing zone, introducing hydrocarbons into the zone of highest pressure, causing the unvaporized hydrocarbons to flow from the zone of highest pressure successively through each zone to the zone of lowest pressure, applying sufficient heat to vaporize desired hydrocarbons and reagent in each zone and withdrawing mixtures of hydrocarbon vapors and reagent from each vaporizing zone in accordance with the distilling characteristics of said hydrocarbons.

3. The method of producing reactable mixtures of a vaporizable reagent and hydrocarbon vapors comprising maintaining a bed of liquefied reagent in the bottom of a still, said still being divided into a plurality of vaporizing zones communicating with each other at their bottoms, maintaining said liquefied reagent at a level sufficient to seal said vaporizing zones from each other, maintaining a pressure gradient through the successive vaporizing zones and a different level of liquefied reagent in the bottom thereof, introducing hydrocarbons into the zone of highest pressure having the lowest level of liquefied reagent, causing the unvaporized hydrocarbons to flow from the zone of highest pressure successively through each zone to the zone of lowest pressure and highest level of liquefied reagent, applying sufficient heat to vaporize desired hydrocarbons and reagent in each zone and withdrawing mixtures of hydrocarbon vapors and reagent from each vaporizing zone in accordance with the distilling characteristics of said hydrocarbon.

4. A still for distilling liquid mixtures comprising a plurality of cencentric open bottomed and closed top cylinders and an outermost concentric closed cylinder having a closed bottom defining the still bottom, concentric baffles extending upwardly from said still bottom to a point a short distance above the open bottom end of each of said open bottomed cylinders and contiguous thereto for partially restricting the flow of liquid from one cylinder to the other adjacent the bottom thereof, said cylinders and baffles forming a plurality of distilling zones, means for introducing liquid mixture to be distilled into the innermost concentric zone, independent valved vapor draw-offs in each zone, means for heating said still, means for withdrawing vapors from each of said zones and means for withdrawing residual liquid from the outermost zone of said still.

ALBERT W. GOLDSBARRY.
MAX M. TOMASZEWSKI.

REFERENCES CITED

The following references are of record in the file of this patent:

UNITED STATES PATENTS

| Number | Name | Date |
| --- | --- | --- |
| 1,242,292 | White et al. | Oct. 9, 1917 |
| 1,318,657 | Frasch | Oct. 14, 1919 |
| 1,784,262 | Wheeler et al. | Dec. 9, 1930 |
| 1,799,414 | Earl et al. | Apr. 7, 1931 |
| 1,852,205 | Gensecke | Apr. 5, 1932 |
| 2,197,872 | Monroe et al. | Apr. 23, 1940 |
| 2,410,401 | Coffman | Oct. 29, 1946 |
| 2,443,970 | Waddill | Jan. 22, 1948 |

FOREIGN PATENTS

| Number | Country | Date |
| --- | --- | --- |
| 793 | Great Britain | of 1870 |
| 6,959 | Great Britain | of 1893 |
| 264,476 | Great Britain | Mar. 1, 1928 |